Patented June 16, 1953

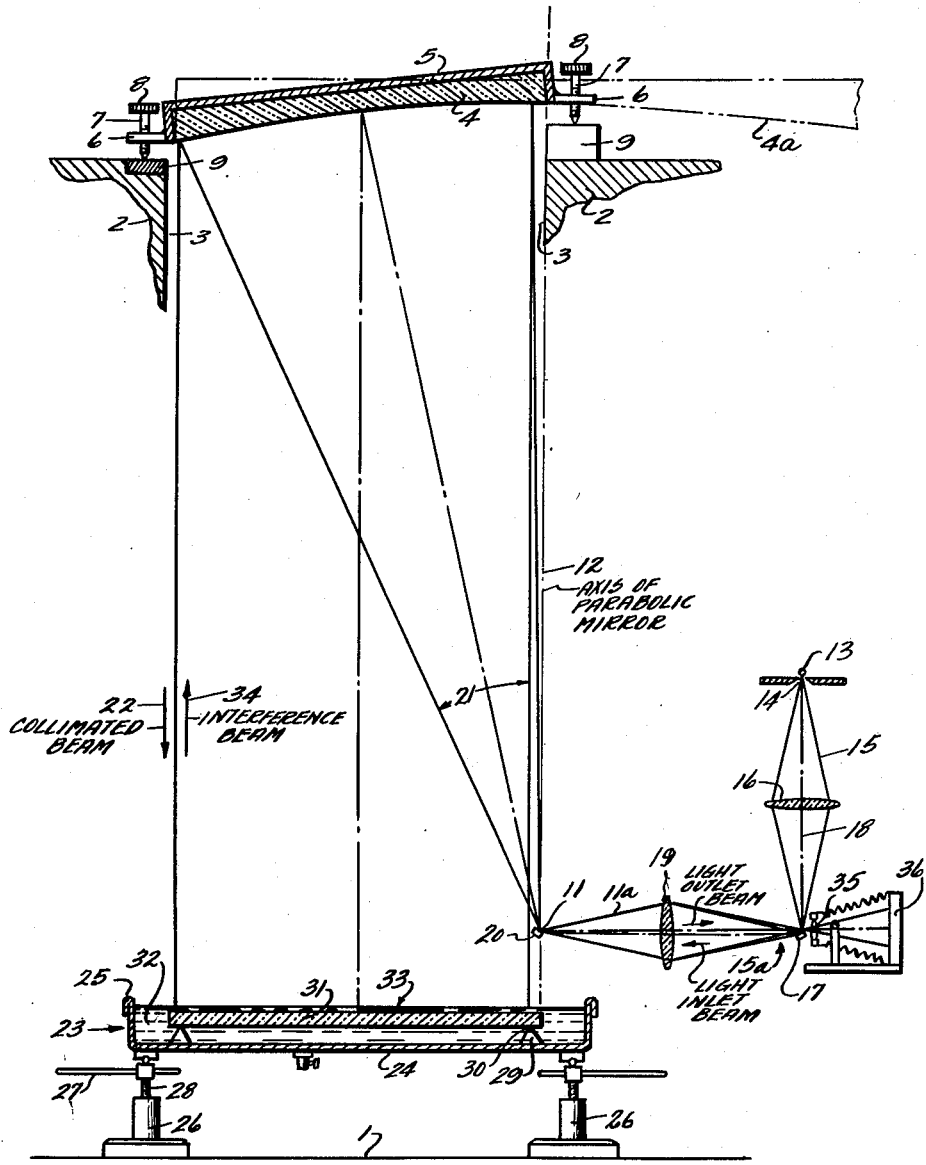

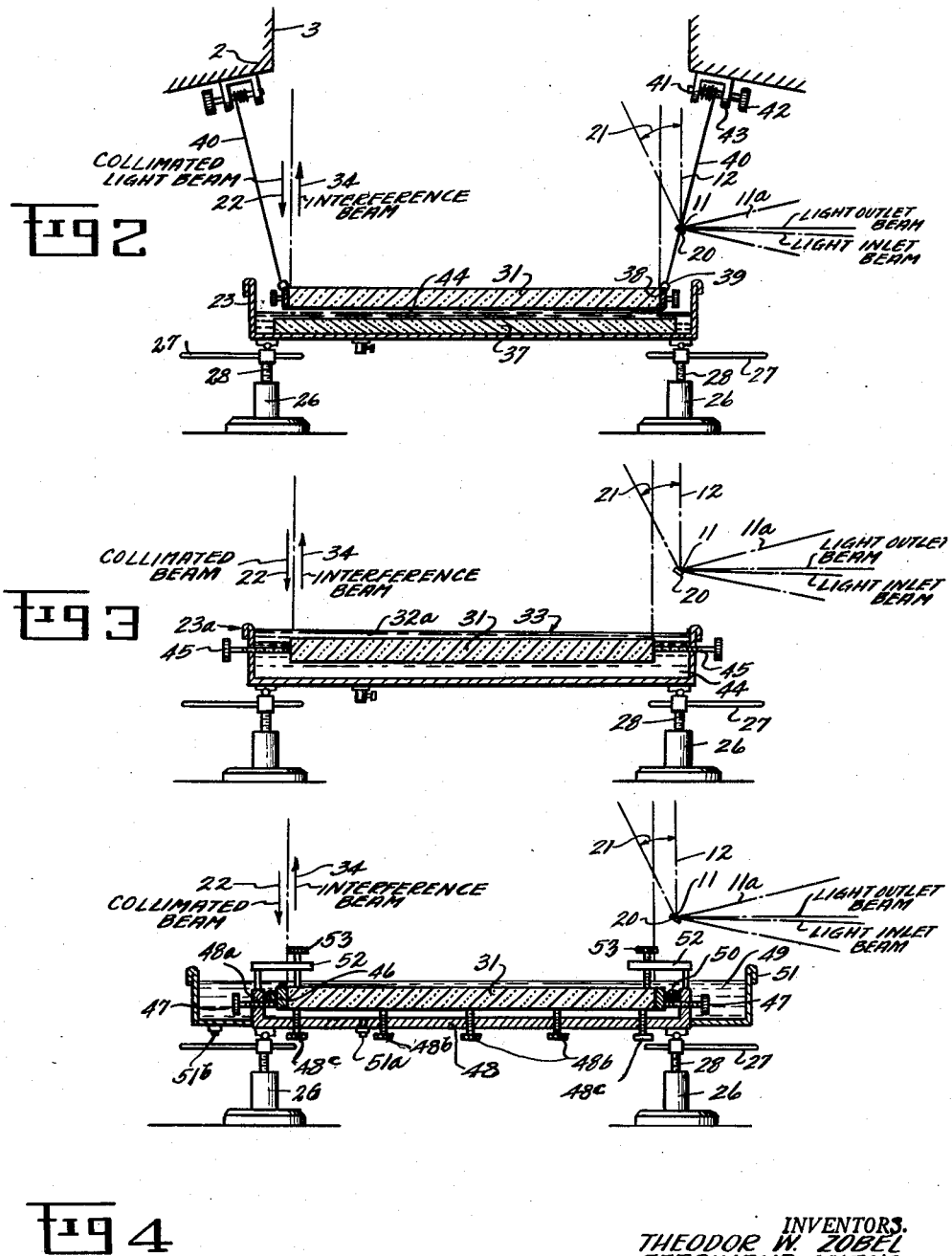

2,641,958

UNITED STATES PATENT OFFICE 2,641,958

METHOD AND TEST EQUIPMENT FOR MEASURING THE QUALITY OF GLASS SURFACES OF UNUSUALLY LARGE DIMENSIONS UNDER DIFFERENT SUPPORTING AND LOADING CONDITIONS

Theodor W. Zobel, Braunschweig, and Ferdinand Mirus, Weiner, Germany

Application January 9, 1951, Serial No. 205,162

7 Claims. (Cl. 88—14)

(Granted under Title 35, U. S. Code (1952), sec. 266)

The invention described herein may be manufactured and used by or for the United States Government for governmental purposes without payment to us of any royalty thereon.

This invention relates to improvements in apparatus for the investigaton of the flatness and optical quality of the surfaces of exceptionally large size glass plates for use in interferometers and similar precision optical apparatus, utilizing a liquid reflecting surface for the flat comparative reflecting surface. The invention includes means for measuring or testing these large plates by light interference methods with the plate being tested disposed in a horizontal position, both in a fully loaded by its own weight condition and in a completely unloaded condition.

The subject invention relates to a pending application filed by us on July 25, 1950, Serial No. 175,846 and entitled "Test Equipment for Measuring the Flatness and Plane Parallelism of Glass Plates of any Desired Sizes and Thickness by Interference." This patent application sets forth a method and apparatus for determining the optical flatness of the surfaces of glass plates of high optical quality and unusually large dimensions by light interference methods, using a liquid reflecting surface as the comparison surface. The proper limit of determining accurately the flatness of unusually large flat optical glass plates which are bendable by their own weight in a position other than a vertical position, utilizing interference measuring methods could not be solved up to the present time in any satisfactory manner except by employing the general principle utilized in the above mentioned patent application and the present invention is an improved apparatus, making it possible to obtain the complete light interference image of the entire reflecting surface of an unusually large comparatively thin glass plate whereby any defects or inaccuracies in the contour of the entire surface area, relative to a comparative liquid reflecting surface coextensive with the plate surface are observable as uneven lines or fringes in the interference image of the whole plate surface, compared to the whole coextensive flat surface of the reflecting liquid.

One of the improvements over the patent application mentioned is the utilization of an optical device which permits the exact investigation of the entire surfaces of unusually large plates in a very simple manner, under different plate supporting conditions to permit the study of the plates under a mechanically deforming process on the plate while the measurements are being made.

In carrying out our invention the apparatus employed is comparatively simple and inexpensive relative to the conventional interferometer apparatus for obtaining light interference comparisons of very large flat plate reflecting surfaces, even if such apparatus could be built, which is at present very doubtful. The only large optical element necessary in our improved interference testing apparatus is a large front surfaced parabolic mirror, or more specifically not more than one-half of such a large mirror to provide a reflecting surface of sufficient area to cover the entire surface of any large flat plate that is to be investigated in which the parabolic reflector to be rigidly supported directly above the plate with its optical action for instance "offset" but vertical so that it extends downwardly to the focal point of a reflector which is located in a horizontal plane a small distance above the plate to be tested, just above some point in the periphery of the tested plate. This arrangement permits a substantially symmetrical light inlet and exit arrangement, two very small optically flat mirrors and two small positive lenses, plus a camera or image viewing screen being the only other precision optical elements required.

The work holder for the plates being tested comprises an annular receptacle adapted to contain any satisfactory or substantially nonviscous liquid, together with means in or adjacent, to the receptacle to support the plate to be tested within the receptacle with its tested surface in juxtaposed spaced relatiin to the liquid surface, just above the liquid surface, or just below the liquid surface, depending upon whether the lower or upper plate surface is to be investigated. There are a number of satisfactorily reflecting liquids available for use in the receptacle, one example being ordinary dust free water. Another liquid that can be used below the plate is mercury. When a relatively heavy liquid is used such as mercury, this liquid can also be employed to float the plate so that its surface will not bend under its own weight, with a second liquid, such as water, employed above the mercury and covering the plate so that the reflecting surface of the water is employed as the optically flat comparative surface.

Provision is also made to support the portion of the tested plate surface intermediate its periphery against bending after or before the surface is investigated in its unloaded condition. Means are also provided for adjusting the plate being tested, to a precise horizontal position and elevation while the plate is either above or below the reflecting surface of the liquid in the receptacle, and for draining the liquid from the receptacle.

One object of the invention is the provision of means for supporting and testing unusually large optical glass reflecting surfaces for flatness, both in their weight loaded and unloaded conditions by light interference methods, utilizing a collimated beam of light which is projected perpendicularly toward the plate when the plate surface is disposed in a horizontal position, and utilizing liquid having a liquid reflecting surface disposed in juxtaposed spaced relation to the surface being investigated as a comparative reflecting surface, whereby the collimated beam is reflected upwardly by the liquid surface and the adjacent flat surface to form an upwardly extending interference beam for indicating the relative flatness of the tested surface of the plate as compared to the flat liquid reflecting surface.

Other objects and advantages of the invention will become apparent by reference to the following description and the accompanying drawings, in which like reference characters refer to like parts in the several figures.

Drawings

Fig. 1 is a somewhat diagrammatic vertical sectional view taken through an optical testing apparatus, incorporating our invention, for testing the flatness and optical quality of the surfaces of unusually large flat plates for use in interferometers and other precision optical apparatus.

Fig. 2 is a fragmentary vertical sectional view of the lower portion of the apparatus similar to that shown in Fig. 1, illustrating a modified arrangement in the form of work holder or supporting means for the unusually large optical plates.

Fig. 3 is a fragmentary vertical sectional view of the work holder and liquid receptacle, showing a modified arrangement for positioning unusually large glass plates within the receptacle, employing radial jack screw means in positioning engagement with the periphery of the plates, the illustration showing the glass plates supported in unloaded condition in a pool of mercury contained in a receptacle, with a transparent reflecting liquid in receptacle having its reflecting surface located above the investigated reflecting surface of the glass plate.

Fig. 4 is a fragmentary vertical sectional view of a further modification of the work holding receptable illustrating a different form of supporting means for the plate being tested.

Referring to Fig. 1 of the drawings the reference numeral 1 indicates a rigid support, which may be a concrete platform on which is mounted an annular support or frame 2 having a suitable large, preferably circular, opening therein indicated at 3. A large, front surfaced parabolic mirror is indicated at 4, rigidly mounted in a recessed annular frame 5, the frame 5 having a plurality of supporting brackets or ears fixed thereon, spaced around its periphery, each ear or bracket being provided with a threadedly mounted vertical microadjustment jack screw 7. The jack screws 7 are each provided with adjusting knobs 8 at their upper ends, while the lower extremities rest on suitable hardened bearing surfaces mounted on the top of the annular support or frame 2. These surfaces may be carried by bearing blocks 9, and any number of these adjustable supports may be provided, but it is presumed that three, suitably spaced about the reflector 4, will be sufficient. Adjustment of all three of the screws 7 raises or lowers the reflector 4 to accurately position its focal point 11 at the desired elevation and individual adjustment of the screws 7 affords the "levelling" adjustment of the reflecting surface to dispose its optical axis 12 in a precise vertical position.

The parabolic reflector 4 is preferably only a portion of a complete parabolic reflector and the unused portion, not required in the apparatus, is indicated in phantom by the reference numeral 4a, just to show the extended parabolic curvature of the surface. The only portion of parabolic reflector which is required is a portion sufficient to be coextensive in area directly above the largest surface area to be occupied by any of the unusually large plates that are to be investigated by the apparatus, with the optical axis of the reflector extending vertically downward at one side of the edge of the tested plate.

Light is concentrated at the focal point 11 of the reflector 4 in the form of a converging light beam 11a, originating from a monochromatic light source 13. A light aperture plate 14 is disposed horizontally below the light source 13 to produce a cone of light 15, and a positive lens 16 in its path converges the beam through a small spot or point onto a very small flat front surfaced full mirror 17, preferably made of quartz or other heat resisting material, and inclined almost, but not quite, 45 degrees relative to the axis 18 of the light beam 15. The mirror 17 reflects the expanding light beam 15a through a second positive or condensing lens element 19 which again converges the beam onto a second very small inclined front surfaced mirror 20, located at the focal point 11 of the large concave portion of the parabolic reflector 4, as shown in Fig. 1 of the drawings. The mirror 20 is inclined, relative to the axis of the beam 15a, to reflect the expanding inlet beam portion 21 to the reflecting surface of the concave mirror 4 to illuminate the same. Since the inlet beam passes through the focal point 11 of the mirror 4 the parabolic reflecting surface of this mirror produces a collimated light beam 22, reflected downwardly, as shown in all of the figures of the drawings.

A work holder for supporting the plate to be tested, and for receiving the reflecting liquid, is indicated at 23 and is in the form of an open topped receptacle having a bottom 24 and an annular vertical sidewall 25. The work holder 23 is located horizontally below the reflector 4, below a horizontal plane passing through the focal point 11 of the reflector 4 and is sufficiently large in area to extend somewhat radially beyond the periphery of the largest plate to be received or tested therein in order that the surface tension of the reflecting liquid adjacent the periphery of the tested plate does not destroy the flatness of the comparative liquid reflecting surface.

The work holder or receptacle 23 is mounted on a plurality of adjustable supporting jacks, indicated at 26 in all of the drawings, at least three being required at spaced points under the receptacle near its periphery. Handle members 27 provide means for rotating the threaded stems 28 of the jacks to raise and lower the supporting ends of the jacks 26 for adjusting the level and elevation. Means are provided for supporting within the receptacle 23, in Fig. 1, the optical plate to be tested, this means comprises an annular supporting ring, or a plurality of triangular spaced rigid supports 29 with their bases resting on the bottom 24 of the receptacle 23 and their apexes supporting the plate to be tested, indicated at 30, located at spaced points around the periphery of the plate.

The work holder or receptacle 23 is levelled by the jacks 26, by manipulation of the handles 27, to dispose the upper (or lower) surface of the plate 31 in a horizontal plane, precisely perpendicular to the collimated vertical light beam 22 so that the portions of the beam reflected by the tested plate surface, and by the surface of the reflecting liquid contained in the receptacle, will be reflected directly back to the parabolic mirror portion of the reflector 4 as the interference beam.

The optically flat, juxtaposed, comparative reflecting surface for the tested surface of the plate is obtained by a predetermined quantity of a suitable nonviscous liquid introduced in the tray or working receptacle 23 and indicated at 32, the quantity being sufficient to either just cover the tested plate when the upper surface of the plate is to be compared, or to seek its level just under the lower surface of the plate when the lower surface of the plate is to be tested.

When the upper surface of the plate is to be tested for flatness the liquid to be used must be transparent and water or any other nonviscous transparent liquid may be used. When the lower surface of the plate is to be tested for flatness water or any other transparent liquid can also be used.

In Fig. 1 the transparent liquid is indicated at 32 and its liquid reflecting surface at 33. A portion of the collimated light beam 22 will be reflected vertically back to the reflector 4 by the liquid surface 33 in combined relation with the portion of the beam reflected by the tested plate surface to form the interference beam, indicated by the reference numeral 34.

The interference beam 34 strikes the reflector 4 and is reflected thereby to form a converging return beam concentrated on the small inclined mirror 11 at the focal point 20 of the mirror 4, the reflected return beam then expands and passes through the positive or condensing lens element 19, converging the returning beam through a point just above the small mirror 17 to produce the expanding beam which passes through a camera having a lens 35 and an image viewing screen or sensitized surface 36 where an image of the interference phenomena is pictured or recorded for inspection by fringes indicating variations in the flatness of the tested surface of the plate relative to the comparative reflecting surface 33 of the liquid 32 within the receptacle 23, covering the tested surface. The slight inclination of the mirror 17 beyond the 45 degree inclination, and a possible slight vertical displacement downwardly of the mirror 17 from a horizontal plane passing through the mirror 20, causes the axis of the returning interference beam to pass just above the mirror 17. The portion of the parabolic mirror 4 that is used is preferably shaped so as to be circular, having a diameter substantially equal to that of the diameter of the largest surface of the plate to be investigated in order that the full area of the plate and a comparative area of the liquid reflecting surface 33 may be simultaneously covered by the collimated beam 22 to thereby provide an interference beam which is representative of the entire test plate surface.

If the pool of mercury is introduced into the receptacle 23, sufficient to float the plate, then the shape or number of the fringes produced on the screen 36 will be representative of the optical quality of the tested surface 33 of the plate 31 in its unloaded condition since the liquid or water will extend above the mercury supporting the plate and will produce an optically flat comparative reflecting surface in juxtaposed relation to the upper surface of the plate.

Referring to Fig. 2, the plate 31 is suspended above the level of the reflecting surface of a nonviscous liquid contained in the receptacle 23. Since the influence of the vibrations on the liquid reflecting surface, which is very sensitive against disturbances, can be reduced to a minimum by controlling the thickness of the liquid layer, in other words, the thinner the layer the less responsive to vibrations. In order to keep the thickness of the layer of the reflecting liquid to a minimum, where the lower surface of the plate is to be investigated, a stabilizing plate 37 is placed on the bottom of the receptacle, this plate having a larger diameter than the diameter of the tested plate 31. The plate to be investigated 31, in this case, is mounted in an annular supporting band 38 secured to the plate at its periphery, suitable spaced rings or eyes 39 being fastened to upper edge of the band 38 to which suspension cables or wires 40 are fastened, preferably at three point suspensions so that the plate can be easily levelled above the reflecting liquid. The upper ends of the cables 40 are wound on cable drums 41 having adjusting knobs 42, preferably employing a conventional worm gear type of fine or slow adjustment. The drums 41 are suitably journalled in brackets 43 which are securely fixed to the upper support 2 within the annular opening 3 through which the collimated light beam passes.

An interference image is produced on the screen 36 by interference between the reflected parallel rays of the light beam 22 striking the liquid reflecting surface above the stabilizing plate 37 and the reflected rays striking the lower surface of the suspended glass plate 31.

In Fig. 3 the plate being investigated is also indicated at 31 and the upper surface of the plate is being tested in an unloaded condition. A predetermined quantity of mercury 44 is introduced into the receptacle 23 in order to float or support the tested plate in an unloaded condition, where its own weight will not produce slight bending within its periphery. The receptacle 23a is similar in size, shape and construction to the receptacle 23 in Fig. 1, except that a plurality of radial set screws 45 are provided which extend through threaded openings in the sidewall toward the periphery of the plate, so that the plate may be centralized under the collimated light beam 22. Supporting jacks 26 are provided for levelling the receptacle 23a if desired. The tightening of the radial set screws 45 while the plate is floating in the mercury pool will now support the plate in its unloaded condition, so that by lowering the level of the mercury surface, the plate surface can also be investigated in its weight loaded condition. Since the mercury surface will be level, the plate surface will also be level for test purposes when floating in the mercury and this arrangement can be employed for levelling the plate before the positioning and supporting set screws 45 are tightened. When the set screws 45 are to be used for supporting the plates 31, it is preferable to utilize the annular band clamped or secured around the periphery of the plate, similar to the band 39 shown in Fig. 2. After the plate is stabilized in the mercury, as shown in Fig. 3, a sufficient quantity of a nonviscous liquid, such as water, is introduced into the receptacle above the mercury pool 44, as indicated at 32a, the water producing a thin layer covering the upper surface to be tested and constituting an optically flat liquid reflecting surface. The portions of the collimated light beam 22 which strike the upper surface of the plate and the upper comparative reflecting surface of the water 32a will be reflected upwardly to the large parabolic mirror portion 4 in a manner like that shown in Fig. 1 as the interference beam 34, and form the interference image on an image screen like the screen 36 previously described.

Fig. 4 illustrates a further modification of a work holding receptacle which can be used for investigating glass plates under the influence of different supporting systems, and for studying the effect of a controllable deformation of the plates. In this way it can be determined just what amount of deformation is necessary in order to correct optical reflecting surfaces, in other words, the lowest optical quality or flatness of surfaces that can be allowed, when the surfaces are used as deformable plate surfaces. The importance of this can be explained by the following example: A glass plate of 36 inches diameter with a thickness of one and one-fourth inches and an accuracy of about half of a light wave length difference over its entire field is estimated for extreme costs. It is considered, however, impossible to obtain such accuracy since the flexibility of the plate and its bending under its own weight amounts to about 35 wave lengths. Very few institutions could afford interferometers utilizing large plates of such accuracy, even if they could be built, because of the great cost entailed, at least four of the plates being required to produce a single interferometer apparatus. Plates with about 50 allowable fringes instead of only one fringe in the whole field would probably reduce the cost per plate to only about $10,000 to $20,000. These lower cost plates are probably optically good enough so that deforming by screws 48b will bring the optical flatness of their surfaces within the minimum fringe requirement of the higher optical quality plates. In Fig. 4 a work holder receptacle 48 is shown for supporting and testing these lower quality plates.

The plate being tested, also indicated at 31, is fixed in an annular supporting ring or band 46 by the set screws 47, threadably journalled in the annular wall 48a. The receptacle 48 is preferably made heavier and more rigid than the receptacle 23 shown in the other forms of the invention, its bottom being formed with threaded openings in which are rotatably mounted adjustable jack screws 48b projecting vertically upwardly below predetermined areas distributed over the lower surface of the plate. A gutter or annular trough 49 extends around the periphery of the tray 48 having an outer wall 51 which is higher than the wall of the receptacle or tray 48. Water or any other selected reflecting liquid is poured into the gutter 49 in sufficient quantity to cover the wall 48a of the receptacle 48 and produce a thin layer covering the plate 31, an annular rubber gasket 50 being interposed between the band 46 and the wall 48a of the receptacle to prevent water leakage below the plate 31. Any space between the supporting band 46 and the rim of the plate 31 is, of course, sealed by any conventional method. A drain opening 51a may be provided in the bottom of receptacle 48 with the plug therefor removed to eliminate the accumulation of leakage water and to admit atmosphere below the plate 31. Supporting brackets 52 are provided for swinging movement over the periphery of the plate, having vertical screws 53 journalled therein for hold down engagement with the plate 31 at its periphery. The outer supporting jack screws 48c may be tightened to support the periphery of the plate against movement by the screws 53 above the plate. While inspecting the quality of the upper surface of the plate by the collimated beam 22 the remaining inner jack screws 48b can be individually and selectively adjusted to slightly deform the plate to improve the optical quality. This is discernable by changes produced in the number, contour and location of the fringes that are projected on the image viewing screen, produced by the interference beam, as described in connection with Fig. 1. By proper and careful manipulation of the set screws 48b′ it can be determined just how much deformation is necessary to bring the plate surface to the desired flatness. This is done while watching the interference figure on the image screen 36.

A plug 51b is provided to drain the gutter 49.

We claim:

1. In an optical apparatus for investigating the optical quality of large area surfaces of an unusually large size plate and especially a thin flat glass plate; a work holder comprising an open top receptacle for receiving the plate; means supporting the plate therein in a horizontal position; said receptacle receiving a reflecting liquid therein having a comparative liquid reflecting surface disposed in vertically spaced close parallel relation to the investigated plate surface; light collimating means including a light source having a symmetrical light inlet and light outlet located above the investigated plate at one side thereof; said collimating means having a parabolic reflector with its optical axis disposed vertically, immediately at one side of the edge of the plate being investigated with a parabolic mirror portion at least as large in area as the area of the investigated plate surface disposed directly above said investigated plate surface with its focal point disposed at the symmetrical light inlet and exit, whereby the parabolic reflecting surface is illuminated by the light inlet to reflect a collimated light beam vertically downward to the investigated plate surface and to the comparison liquid reflecting surface, and is reflected upwardly, partially by the comparative liquid surface and partially by the investigated plate surface to form a reflected returning interference beam, reflected by the parabolic mirror portion through its focal point as the light exit beam; and optical means disposed in the exit beam for producing an image of the light interference in the interference beam between the entire plate surface and the liquid reflecting surface.

2. In an optical apparatus for simultaneous investigation of the optical quality of the entire surface areas of an unusually large size plate and especially a thin glass plate; work holding receptacle means for receiving and rigidly supporting the plate within the receptacle with its surface to be investigated positioned in a horizontal position in spaced relation to the sides of the receptacle below the top thereof; said receptacle being adapted to receive a nonviscous reflecting liquid having a comparative liquid reflecting surface disposed in vertically spaced close parallel relation to the investigated plate surface when the plate surface is disposed in a horizontal position in the receptacle, means for rigidly supporting the receptacle to dispose the plate surface being investigated in said horizontal position, light collimating means including a monochromatic light source, having a symmetrical light inlet and light outlet located above the receptacle and the investigated plate at one side thereof; said collimating means comprising a parabolic front surfaced mirror portion having a sufficient reflecting surface area to fully cover the area of the plate surface area being investigated, located directly above the surface of the plate, said parabolic reflector having its optical axis disposed vertically, immediately at one side of the edge of the investigated plate and a focal point on said axis; a small plane mirror inclined across the focal point for reflecting the inlet and outlet beam respectively reflected to and from the parabolic mirror; and interference image picturing means positioned in the outlet beam reflected by the inclined plane mirror for producing a picture image of the light interference in the last mentioned reflected portion of the outlet light beam, the parabolic mirror having its focal point located on said axis above the surface of the reflecting liquid in the work holder.

3. In apparatus for the investigation of the optical quality of flat surfaces of a glass plate of unusually large size, a plate and liquid receiving work holding receptacle for receiving the plate to be investigated therein and a quantity of liquid having a liquid reflecting surface covering the plate surface to be investigated; means for supporting and leveling the glass plate in the receptacle to dispose the investigated surface thereof in a horizontal position with the reflecting liquid forming a liquid layer having an upper reflecting surface disposed in closely spaced parallel relation to the investigated plate surface, a rigid support having an opening therein surrounding the area directly above investigated plate surface, a mirror supporting frame disposed above the opening; a portion of a parabolic mirror fixed in the frame having a reflecting surface area at least as great as the area of the investigated plate surface extending over the opening, with its optical axis extending vertically downward at one side of the center of the investigated plate surface and a focal point on said axis located at an elevation above the receptacle; adjustable supporting means between the support and the parabolic mirror frame for adjusting the frame to dispose the said axis of the mirror in a vertical direction, a monochromatic light source disposed at one side of the receptacle having a light aperture; condenser lens means for converging light from said source through a point to form an expanding light beam; a small plane mirror inclined across the axis of the converging light beam at almost but not quite 45° to a line extending through the optical axis of the condenser means and light source for reflecting the inlet light beam toward the focal point of the parabolic mirror; a second condenser lens disposed in the inlet beam reflected by the said small plane mirror for condensing the inlet beam reflected by the said small full mirror through the focal point of the parabolic mirror; and a second small plane mirror inclined across the inlet beam approximately at the last mentioned focal point for reflecting the expanding inlet beam to illuminate the reflecting surface of the parabolic mirror; whereby the inlet beam is reflected by the parabolic mirror as a collimated beam to illuminate the entire investigated reflecting surface of the plate and the adjacent comparative liquid reflecting surface, and reflected by said surfaces to form the outlet interference beam, reflected back approximately through the focal point, and reflected by the second mentioned small plane mirror through the second mentioned condenser lens, through a point immediately next to the first mentioned small plane mirror, as a portion of the exit beam; and lens and image screen means in the exit beam, located beyond the last mentioned point, for producing a picture image of the light interference in the reflected exit interference beam.

4. A work holder for optical apparatus for investigating the optical quality of an unusually large flat glass plate by light interference, comprising horizontal tray-like receptacle having an annular wall adapted to receive the plate therein in substantially parallel relation to the bottom of the receptacle; an annular trough extending around the periphery of the receptacle having an outer annular wall extending to an elevation above the annular wall of the receptacle; a plurality of adjustable supports rigidly supporting the receptacle and adjustable to position the investigated surface of the plate in a precise horizontal position; a plurality of radially adjustable supporting screws carried by the receptacle for positioning and supporting the plate to be investigated at its periphery; annular liquid sealing means disposed around the inner top portion of the wall of the receptacle for liquid sealing engagement with the investigated plate at its periphery; a drain opening in the bottom of the receptacle and a plurality of vertically adjustable plate supports carried by the receptacle for touching and supporting engagement with the lower surface of the plate, below predetermined areas of its investigated upper surface; whereby a transparent liquid reflecting medium having an upper liquid reflecting surface, introduced into the trough in a sufficient quantity, will overflow the top of the receptacle wall to form a liquid layer above the investigated surface of the plate with the upper surface of the liquid providing an optically flat liquid comparative reflecting surface disposed in juxtaposed closely spaced relation above the reflecting plate surface to be investigated, so that a beam of collimated monochromatic light projected downwardly, substantially vertically, from above to illuminate the entire surface to be investigated of the plate will be reflected upwardly, partially by the investigated plate surface and partially by the liquid reflecting surface, to form an interference beam representative of the optical quality of the entire investigated plate surface.

5. Apparatus as claimed in claim 4, including parabolic mirror means disposed directly above the receptacle having a reflecting surface area facing the investigated plate surface as large as the investigated plate surface, with an optical axis extending perpendicular toward the liquid reflecting surface and a focal point on said axis, located above the liquid reflecting surface; means for illuminating the entire reflecting surface of the parabolic mirror substantially from said focal point to reflect a substantially vertical beam of collimated light onto the entire investigated plate surface and the comparative liquid reflecting surface above the plate, to be reflected partially by each of the last mentioned reflecting surfaces to form a light interference beam, and means in the interference beam for producing an interference image picture of the light interference in said interference beam.

6. In optical apparatus for simultaneously investigating the entire reflecting surface of an unusually large optical flat plate by light interference comprising, an open top working holding receptacle adapted to contain a nonviscous transparent liquid having a comparative liquid reflecting surface and a pool of mercury for supporting and leveling the optical plate with the surface to be investigated within the confines of the side wall of the receptacle and facing upwardly in slightly submerged relation to the reflecting surface of the nonviscous liquid in the receptacle to provide a liquid layer covering the investigated plate surface, reflector means comprising a parabolic mirror portion having its optical axis extending vertically downward at one side of the edge of the investigated plate with its focal point located above the receptacle on said optical axis; radial positioning means carried by the wall of the receptacle, engageable with the edge of the plate for centralizing the plate within the receptacle; a plurality of vertically adjustable supports carried by the bottom of the receptacle and individually adjustable vertically to engage the lower surface of the investigated plate in predetermined spaced areas thereof to support the reflecting surface being investigated to prevent sagging thereof during investigation and when the mercury is removed; whereby the investigated plate can be floated in the pool of mercury contained in the receptacle to determine the horizontal unloaded condition and position of the plate while the plate is centralized in the receptacle, light inlet means for illuminating the parabolic reflector means through its focal point to produce a collimated light beam reflected vertically downward by the parabolic reflector means to the investigated plate surface and to the comparative reflecting surface of the nonviscous liquid; whereby the collimated beam is reflected back to the parabolic reflector partially by said plate and partially by the nonviscous liquid reflecting surface to produce an upwardly reflected interference beam which is reflected by the parabolic reflector means downwardly through its focal point to form light exit interference beam; and optical means in the path of the light exit interference beam including an image screen for forming a picture image on the screen of the light wave interference in the interference beam.

7. The method for determining the optical flatness quality of the reflecting surface of a large, relatively thin glass plate by light interference which comprises floating the plate in a confined pool of mercury larger in surface area than the investigated plate surface area to determine the horizontal position of the plate with the investigated surface facing upwardly, supporting the periphery of the plate while floating in the mercury, covering the investigated plate surface with a thin transparent layer of liquid supported by the mercury and plate to provide a flat light reflecting surface in closely spaced parallel relation above the investigated plate surface, projecting a collimated light beam vertically downward to the reflecting surface of the transparent liquid layer and the investigated plate surface to form an interference beam reflected upwardly by said investigated surface and said liquid surface, and reflecting said interference beam out of the collimated beam through a point to an image screen to form an interference image of the light interference between said investigated plate surface and the upper surface of the liquid.

THEODOR W. ZOBEL.
FERDINAND MIRUS.

References Cited in the file of this patent

UNITED STATES PATENTS

| Number | Name | Date |
| --- | --- | --- |
| 1,044,502 | Crehore et al. | Nov. 19, 1912 |
| 2,215,211 | Devol | Sept. 17, 1940 |
| 2,256,855 | Zobel | Sept. 13, 1941 |
| 2,362,235 | Barnes | Nov. 7, 1944 |
| 2,378,930 | Kendall et al. | June 26, 1945 |
| 2,425,758 | Saunders | Aug. 19, 1947 |
| 2,450,839 | Merritt | Oct. 5, 1948 |
| 2,452,364 | Fowler et al. | Oct. 26, 1948 |
| 2,460,836 | Lovins | Feb. 8, 1949 |
| 2,483,244 | Stamm | Sept. 27, 1949 |

FOREIGN PATENTS

| Number | Country | Date |
| --- | --- | --- |
| 509,310 | Germany | Oct. 8, 1930 |